United States Patent [19]

Bosso et al.

[11] 4,134,816

[45] Jan. 16, 1979

[54] PROCESS FOR CATIONIC ELECTRODEPOSITION

[75] Inventors: Joseph F. Bosso, Lower Burrell; Lance C. Sturni, McKeesport, both of Pa.

[73] Assignee: PPG Industries, Inc., Pittsburgh, Pa.

[21] Appl. No.: 884,333

[22] Filed: Mar. 7, 1978

Related U.S. Application Data

[62] Division of Ser. No. 562,086, Mar. 26, 1975, Pat. No. 4,101,486.

[51] Int. Cl.$^2$ .............................................. C25D 13/00
[52] U.S. Cl. ................................................ 204/181 C
[58] Field of Search ..................................... 204/181 C

[56] References Cited

U.S. PATENT DOCUMENTS 3,928,156  12/1975  Wismer et al. ................... 204/181 C
4,031,050   6/1977  Jerabek ............................ 204/181 C Primary Examiner—Howard S. Williams
Attorney, Agent, or Firm—William J. Uhl

[57] ABSTRACT

Aqueous coating compositions comprising a blocked organic polyisocyanate and a resin containing active hydrogen atoms and quaternary ammonium groups are disclosed. The resin is prepared by the reaction of a polyepoxide with an amine-acid salt. These compositions deposit on the cathode to provide coatings having excellent properties.

12 Claims, No Drawings

PROCESS FOR CATIONIC ELECTRODEPOSITION

This is a division of application Ser. No. 562,086, filed Mar. 26, 1975, now U.S. Pat. No. 4,101,486.

BACKGROUND OF THE INVENTION

1. Field of the Invention

This invention relates to resinous electrodepositable compositions which deposit on the cathode. More particularly, this invention relates to quaternary ammonium salt-containing resins which are prepared from reacting a polyepoxide with an amine-acid salt.

2. Brief Summary of the Prior Art

Electrodeposition as a coating application method involves the deposition of a film-forming material under the influence of an applied electrical potential, and has become of increasing commercial importance. Along with the increased use of such methods has been the development of various compositions which provide more or less satisfactory coatings when applied in this manner. However, most conventional coating techniques do not produce commercially usable coatings, and electrodeposition of many coating materials, even when otherwise successful, is often attended by various disadvantages such as non-uniform coatings and by poor throwpower, i.e., the ability to coat areas of the electrode which are remote or shielded from the other electrode. In addition, the coatings obtained are, in many instances, deficient in certain properties essential for their utilization in certain applications for which electrodeposition is otherwise suited. In particular, properties such as corrosion resistance and alkali resistance are difficult to achieve with the resins conventionally employed in electrodeposition processes, and many electrodeposited coatings are subject to discoloration or staining during baking of the coating or because of chemical changes associated with electrolytic phenomena at the electrodes and with the types of resinous materials ordinarily utilized. This is especially true with the conventional resin vehicles used in electrodeposition processes which contain polycarboxylic acid resin neutralized with a base; these deposit on the anode and because of their acidic nature, tend to be sensitive to common types of corrosive attack, e.g., by salt, alkali, etc. Further, anodic deposition tends to place the uncured coating in proximity to metal ions evolved at the anode, thereby causing staining with many coating systems.

SUMMARY OF THE INVENTION

In accordance with the present invention, a method of coating a conductive substrate serving as a cathode which comprises passing electric current between an anode and the cathode in electrical contact with a water-dispersed composition comprising an aqueous dispersion of:

(A) a quaternary ammonium salt group-solubilized organic resin containing active hydrogen atoms which is the reaction product of:
  (1) a tertiary amine-acid salt, and
  (2) a polyepoxide;
(B) a capped organic polyisocyanate stable at room temperature in the presence of said resin (A) and reactive with the active hydrogens of said resin (A) at elevated temperatures to form a cured product, cured through urethane crosslinks.

DETAILED DESCRIPTION OF THE INVENTION

It has been found that aqueous compositions of the present invention may be electrodeposited on the cathode to produce coatings with highly desirable properties, including alkali, salt spray and detergent resistance. In addition, it has been found that the aqueous dispersions of the present invention have a surprisingly high throwpower and, in addition, can be cured to hard, organic solvent-resistant coatings at relatively low curing temperatures. The ability to cure the coatings at low temperatures minimizes the danger of the coatings discoloring during curing.

The capped or blocked isocyanate which may be employed in the compositions of the invention may be any isocyanate where the isocyanato groups have been reacted with a compound so that the resultant capped isocyanate is stable to active hydrogen atoms of the quaternary ammonium salt-containing resin at room temperature but reactive with the active hydrogens at elevated temperatures, usually between about 93° C. and about 316° C.

In the preparation of the blocked organic polyisocyanate, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetra-isocyanates such as 4,4'-diphenyl-dimethyl methane-2,2',5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, or simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic aromatic alkyl monoalcohol and phenolic compound may be used as a blocking agent in accordance with the present invention, such as, for example, lower aliphatic alcohols, such as methyl, ethyl, chloroethyl, propyl, butyl, amyl, hexyl, heptyl, octyl, nonyl 3,3,5-trimethylhexanol, decyl and lauryl alcohols, and the like; the aromatic-alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, xylenol, nitrophenol, chlorophenol, ethyl phenol, t-butyl phenol and 2,5-di-t-butyl-4-hydroxy toluene. Minor amounts of even higher molecular weight, relatively non-volatile monoalcohols may be used, if desired, to serve as plasticizers in the coatings provided by this invention.

Additional blocking agents include tertiary hydroxyl amines such as diethylethanolamine, lactams such as caprolactam and oximes such as methyl ethyl ketone oxime, acetone oxime and cyclohexanone oxime. Use of oximes and phenols is particularly desirable because specific polyisocyanates blocked with these agents uncap at relatively low temperatures without the need for externally added urethane-forming catalyst such as tin catalyst described below.

The organic polyisocyanate-blocking agent adduct is formed by reacting a sufficient quantity of blocking agent with the organic polyisocyanate to insure that no free isocyanate groups are present.

As previously stated, the resin employed in the composition and method of this invention is a coating composition containing an aqueous dispersion prepared from a capped organic polyisocyanate and a resin which is an adduct of an amine-acid salt with a polyepoxide to form a room temperature stable coating composition.

The epoxy material utilized to form the adduct can be any monomeric or polymeric compound or mixture of compounds having an average of one or more epoxy groups per molecule. The monoepoxides can be utilized, but it is preferred that the epoxy compound be polymeric and that the polyepoxide contain one or more epoxy groups per molecule, that is, have an epoxy equivalent greater than 1. The epoxy can be essentially any of the well-known epoxides. A particularly useful class of polyepoxides are the polyglycidyl ethers of polyphenols such as Bisphenol A. These can be produced, for example, by etherification of a polyphenol with epichlorohydrin or dichlorohydrin in the presence of an alkali. The phenolic compound may be, for example, bis(4-hydroxyphenyl)2,2-propane, 4,4'-dihydroxybenzophenone, bis(4-hydroxyphenyl)1,1-ethane, bis(4-hydroxyphenyl) 1,1-isobutane, bis(4-hydroxytertiarybutylphenyl)2,2-propane, bis(2-hydroxynaphthyl)methane, 1,5-dihydroxynaphthylene, or the like. In many instances, it is desirable to employ such polyepoxides having somewhat higher molecular weight and containing aromatic groups. These can be provided by reacting the polyglycidyl ether above with a polyphenol such as Bisphenol A.

While the polyglycidyl ethers of polyphenols may be employed per se, it is frequently desirable to react a portion of the reactive sites (e.g., hydroxyl or, in some instances, epoxy) with a modifying material to vary the film characteristics of the resin. For example, the polyepoxides can be esterified with carboxylic acids, especially fatty acids. Especially preferred are saturated fatty acids and especially pelargonic acid.

Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are non-phenolic and are obtained by the epoxidation of alicyclic olefins; for example, by oxygen and selected metal catalysts, by perbenzoic acids, by acetaldehyde monoperacetate, or by peracetic acid, and/or hydrogen peroxide. Among such polyepoxides are the epoxy alicyclic ethers and esters which are well known in the art.

A preferred class of polyepoxides which may be employed is acrylic polymers containing epoxy groups. Preferably these acrylic polymers are polymers formed by copolymerizing an unsaturated epoxycontaining monomer, such as, for example, glycidyl acrylate or methacrylate, a hydroxyl-containing unsaturated monomer and at least one other unsaturated monomer.

The preferred hydroxyl-containing unsaturated monomers are hydroxyalkyl acrylates; for example, hydroxyethyl acrylate or methacrylate or hydroxypropyl acrylate or methacrylate may be used.

The other unsaturated monomer can be any polymerizable monomeric compound containing at least one $CH_2=C>$ group, preferably in terminal position, and may be polymerized with the unsaturated glycidyl compounds. Examples of such monomers include aromatic compounds such as phenyl compounds, for example, styrene, alpha-methylstyrene, vinyl toluene and the like. Also, aliphatic compounds such as olefinic acids and esters such as acrylic acid, methylacrylate, ethyl acrylate, methyl methacrylate and the like may be used.

In carrying out the polymerization reaction, techniques well known in the art may be employed. A peroxide-type catalyst is ordinarily utilized; diazo compounds or redox catalyst systems can also be employed as catalysts.

Another method of producing acrylic polymers which may be utilized in this invention is to react an acrylic polymer containing reactive sites with an epoxy-containing compound such as the diglycidyl ether of Bisphenol A or other polyepoxides as enumerated elsewhere herein, to provide an epoxy group-containing acrylic polymer.

The polyepoxides used in the practice of the invention contain active hydrogen atoms; the activity of the hydrogen being determined according to the Zerewitinoff test as described by Kohler in *Journal of the American Chemical Society*, 49, 3181 (1927). Examples of active hydrogens include hydrogens attached to oxygen, nitrogen and sulfur. The active hydrogens provide reactive sites for crosslinking with the isocyanate curing agent.

To form the quaternary ammonium group-containing resins of the invention, the polyepoxide is reacted with an amine-acid salt, preferably a tertiary amine-acid salt, to form quaternary amine salt group-containing resins. Primary and secondary amine-acid salts may be employed to form quaternary ammonium group-containing resins, but their use is less preferred. In using primary and secondary amine-acid salts, the stoichiometry of epoxy to amine-acid salt is selected to form a resin containing the amine-acid salt and free unreacted epoxy groups; the amine-acid salt forming through the epoxy group. The unreacted epoxy groups can then further react with the amine-acid salt contained in the resin to form quaternary salts. Quaternary ammonium-containing resins prepared in this manner are less preferred than using tertiary amine-acid salts, however, because the resulting product is a complex resinous mixture containing quaternary ammonium salts, secondary and tertiary amine-acid salts. Such mixtures, when dispersed in water to form an electrodeposition bath, generally have too high a pH for good dispersibility and electrocoating. Although acid can be added to lower the pH, this presents corrosion problems.

Where final resins containing free epoxide groups are desired, the ratio of starting polyepoxide to tertiary amine-acid salt is selected so as to provide an excess of epoxy groups, thereby producing a resin containing free unreacted epoxide groups. Epoxy-free resins can be prepared by reacting stoichiometric amounts of tertiary amine-acid salts with the available epoxide groups. Epoxy-free resins can also be provided by hydrolysis or post reaction of the epoxide-amine acid salt reaction product.

Examples of amine-acid salts which may be employed include amine salts of boric acid or an acid having a dissociation constant greater than that of boric acid and preferably an organic acid having a dissociation constant greater than about $1 \times 10^{-5}$. The preferred acid is lactic acid. Examples of other acids include boric acid, lactic acid, acetic acid, formic acid, propionic acid, butyric acid, hydrochloric acid, phosphoric acid and sulfuric acid.

The amine portion of the amine-acid salt is an amine which may be unsubstituted or substituted with constituents such as hydroxylamines, as long as the substituent does not interfere with the reaction of the amine-acid salt and the polyepoxide and the substituents are of such a nature or employed under conditions so that they do not gel the reaction mixture. The preferred amines are tertiary amines, and examples include dimethylethanolamine, triethylamine, trimethylamine, triisopropanolamine and the like. Examples of other suitable amines are disclosed in U.S. Pat. No. 3,839,252 to Bosso and Wismer in column 5, line 3, through column 7, line 42, which is hereby incorporated by reference. The amine-acid salt is formed by reacting the amine with the acid by techniques well known in the art. Also, amine-acid mixtures may be employed, although they usually react to form the acid salt.

The amine-acid salt and the polyepoxide are reacted by mixing the components, preferably in the presence of a controlled amount of water. The amount of water employed should be that amount of water which allows for smooth reaction with the epoxy groups but not sufficient to cause extremely slow or non-reaction. Typically, the water is employed on the basis of about 1.75 percent to about 20 percent by weight, based on the total reaction mixture solids and preferably about 2 percent to about 15 percent by weight, based on total reaction solids.

Another measure of the amount of water which may be employed is the equivalent ratio of water to amine nitrogen present in the reaction mixture. Typically, the equivalent ratio of water to amine nitrogen is controlled between about 1.3 to about 16 equivalents of water per equivalent of amine nitrogen.

The reaction temperature may be varied between about the lowest temperature at which the reaction reasonably proceeds, for example, room temperature, or in the usual case, slightly above ordinary room temperature to a maximum temperature between about 100° C. and about 110° C.

A solvent is not necessary, although one is often used in order to afford better control of the reaction. Aromatic hydrocarbons or monoalkyl ethers of ethylene glycol are suitable solvents. The proportions of the amine-acid salt and the epoxy compound can be varied and the optimum proportions depend upon the particular reactants. Ordinarily, however, from about one part to about 50 parts by weight of the salt per 100 parts of polyepoxide are employed. The proportions are usually chosen with reference to the amount of nitrogen derived from the quaternizing agent, which is typically from about 0.05 to about 16 percent based on the total weight of the amine salt and the polyepoxide. Preferably, substantially all of the nitrogen is in the form of chemically bound quaternary ammonium salt groups, although in some instances, less than 100 percent of the nitrogen is in the form of quaternary ammonium salt groups. An example of this situation would be when primary and secondary amines are used to form the quaternary salt-containing resins. Such resins, as described above, usually also contain secondary and tertiary amine salts.

The polyisocyanate-blocking agent adduct is preferably admixed with the quaternary ammonium salt-containing resin in ratios of from about 0.1 to about 1.0 urethane group for each active hydrogen.

It is usually necessary, in order to insure rapid and complete reaction of the two components, to have present in the coating mixture a catalyst for urethane formation. However, if curing temperatures after deposition are high enough, catalyst may not be needed. Also, if a proper blocking agent for the isocyanate is employed, e.g., oximes, lactams and phenols, catalysts may not be needed. Examples of externally added catalyst are the tin compounds such as dibutyltin dilaurate, dibutyltin diacetate, dibutyltin oxide, which are preferred, but other catalysts for urethane formation known in the art may be employed. The amount of catalyst employed is that amount which effectively promotes reaction in the deposited film, for example, amounts varying from about 0.5 percent to about 4 percent by weight of the quaternary ammonium salt-containing resin and the capped isocyanate crosslinker may be employed. Typically, about 2 percent by weight are employed.

The capped isocyanate-quaternary ammonium salt-containing resin mixture is electrodeposited on a suitable substrate and cured at elevated temperatures, such as from about 93° C. to about 316° C., the film curing at least in part through urethane crosslinks. The alcohol released may either volatilize or remain in the mixture as a plasticizer, depending essentially on its boiling point.

Aqueous compositions containing the above components are highly useful as coating compositions, particularly suited to application by electrodeposition, although they may also be applied by conventional coating techniques. It is desirable to electrodeposit these coatings from a solution having a pH between 3 and about 9.

Electrodepositable compositions, while referred to as "solubilized," in fact, are considered a complex solution, dispersion or suspension, or a combination of one or more of these classes in water, which acts as an electrolyte under the influence of an electric current. While no doubt in some cases the resin is in solution, it is clear that in some instances and perhaps in most, the resin is a dispersion which may be called a molecular dispersion of molecular size between a colloidal suspension and a true solution.

The concentration of the product in water depends upon the process parameters to be used and is, in general, not critical, but ordinarily the major proportion of the aqueous composition is water, e.g., the composition may contain 1 to 40 percent by weight of resin. In most instances, a pigment composition and, if desired, various additives such as anti-oxidants, surface-active agents, coalescing solvents and the like known in the electrodeposition art are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow, or the like.

In electrodeposition processes employing the aqueous coating compositions described above, the aqueous composition is placed in contact with an electrically conductive anode and an electrically conductive cathode, with the surface to be coated being the cathode. Upon passage of electric current between the anode and the cathode, while in contact with the bath containing the coating composition, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition.

The method of the invention is applicable to the coating of any electrically conductive substrate, and especially metals such as steel, aluminum, copper or the like.

After deposition, the coating is cured at elevated temperatures by any convenient method such as in baking ovens or with banks of infrared heat lamps. Curing temperatures are preferably from about 177° C. to about 218° C., although curing temperatures from about 93° C. to about 260° C. or even 316° C. may be employed, if desired.

Illustrating the invention are the following examples, which, however, are not to be construed as limiting the invention to their details. All parts and percentages in the examples, as well as throughout this specification, are by weight unless otherwise specified.

EXAMPLE I

A reaction vessel was charged with 412.3 parts by weight of Bisphenol A and 1225.7 parts by weight of an epoxy resin solution (1025.7 parts solids) made from reacting epichlorohydrin and Bisphenol A. The resin had an epoxy equivalent of approximately 193–203 and was commercially available from Shell Chemical Company as EPON 829. The reaction mixture was heated under a nitrogen blanket to exotherm, the highest temperature being 162° C. The reaction was controlled at 150°–162° C. for about 80 minutes. The reaction mixture was then cooled to 155° C. and charged with 9.1 parts by weight of a hydrocarbon oil-containing diatomaceous earth surfactant commercially available as FOAM KILL 639 dissolved in 156.1 parts by weight of 2-ethylhexanol.

The reaction mixture was further cooled to 100° C. at which time a solution of 196 parts by weight of dimethyl ethanolamine-lactic acid salt (75 percent solids in isopropanol) dissolved in 112.7 parts by weight of a 4.5 percent by weight aqueous boric acid solution was added to the reaction mixture over a 15-minute period to quaternize the epoxy resin. After addition of the quaternizing agent, the reaction mixture was opaque. The reaction mixture was then cleared by digesting at 90° C. for 45 minutes. The mixture was then diluted with 406 parts by weight of methyl ethyl ketone.

A pigment paste was prepared from the following charge:

| Ingredient | Parts by Weight |
| --- | --- |
| TiO$_2$ | 400 |
| dibutyltin oxide | 40 |
| TWEEN 40 polyoxyethylene sorbiton palmitale | 4.0 |
| deionized water | 239 |

The above charge was ground in a sand mill to a Hegman No. 7.

An electrodeposition bath was prepared by combining 107.2 parts by weight of the pigment paste prepared as described above (69.7 parts pigment solids) with 190 parts by weight of the quaternized resin prepared as described in the beginning of Example I (133 parts solids) and 23.5 parts of 2-ethylhexanol fully capped isophorone diisocyanate. This mixture was diluted with 1940 parts by weight of deionized water to form about a 10 percent solids bath.

Cold rolled steel and zinc phosphated steel panels were cathodically coated by this bath (bath temperature 27° C.) using 350 volts for 90 seconds to produce adherent coatings on the cathode which when baked at 177° C. for 20 minutes gave hard, acetone-resistant films of 0.6–0.8 mil thickness.

EXAMPLE II

An electrodeposition bath was prepared by combining 190 parts by weight (133 parts solids) of the quaternized resin of Example I with 24.7 parts by weight of 2-ethylhexanol fully capped 2,4-toluene diisocyanate and 107.2 parts by weight of the pigment paste described in Example I. The mixture was further diluted with 1940.1 parts by weight of deionized water to form about a 10 percent solids bath.

Cold rolled steel and zinc phosphated steel panels were cathodically coated by this bath (bath temperature 27° C.) using 350 volts for 90 seconds to produce adherent coatings on the cathode which when baked at 177° C. for 20 minutes gave hard, acetone-resistant films of 0.6–0.7 mil thickness.

EXAMPLE III

A reaction vessel was charged with 302 parts by weight of Bisphenol A and 1770 parts by weight (1700 parts solids) of EPON 829. The reaction mixture was heated under a nitrogen blanket to exotherm, the highest temperature being 168° C., for 90 minutes.

The reaction mixture was then cooled to 115° C. and charged with 850 parts by weight of polypropylene glycol having a molecular weight of 625. The reaction mixture was then cooled to room temperature and stored overnight under a nitrogen atmosphere. The following morning, the reaction mixture was heated under a nitrogen blanket to 115° C., at which time 5.5 parts by weight of dimethyl ethanolamine was added to the reaction mixture. The reaction mixture was maintained at a temperature of 130°–138° C. for about 8 hours and 40 minutes, after which time 9.8 parts by weight of an 85 percent by weight aqueous lactic acid solution and 15 parts by weight of FOAM KILL 639 dissolved in 260 parts by weight of 2-ethylhexanol were added to the reaction mixture.

The reaction mixture was then cooled to 98° C., at which time 162 parts by weight of dimethyl ethanolamine-lactic acid salt (75 percent solids in isopropanol) and 150 parts by weight of deionized water were added to the reaction mixture to quaternize the resin. After addition of the quaternizing agent, the reaction mixture was held at a temperature of 90–92° C. for 45 minutes and then thinned with 228 parts by weight of isopropanol and 536.7 parts by weight of deionized water.

A pigment paste was prepared from the following charge:

| Ingredient | Parts by Weight |
| --- | --- |
| grinding vehicle[1] | 296.94 |
| deionized water | 260.82 |
| TiO$_2$ | 843.31 |
| aluminum silicate | 95.02 |
| carbon black | 2.08 |
| yellow iron oxide | 3.46 |
| red iron oxide | 5.94 |

[1]The grinding vehicle was a quaternary ammonium-containing resin prepared from the following charge:

| Ingredient | Parts by Weight |
| --- | --- |
| EPON 829 | 87.0 |
| Bisphenol A | 14.8 |
| polypropylene glycol (MW=625) | 38.8 |
| dimethyl ethanolamine | 0.25 |
| formic acid | 0.17 |
| dimethyl ethanolamine-lactic acid salt (75 percent solids in isopropanol) | 29.0 |
| deionized water | 69.9 |
| 2-ethylhexanol | 11.3 |
| FOAM KILL 639 | 0.8 |

The grinding vehicle had a solids content of 64.3 solids and was prepared as generally described above for the containing resin of Example III.

The pigment paste charge was ground in a sand mill to a Hegman No. 7.

An electrodeposition bath was prepared by mixing 94.9 parts by weight of the pigment paste described above with 243.5 parts by weight of the resin prepared as described in the beginning of Example III and with 10 parts by weight of 2-ethylhexanol fully capped 2,4-toluene diisocyanate and 2.1 parts by weight of dibutyltin diacetate. The mixture was thinned with 8 parts of 2-ethylhexanol and 2141.4 parts by weight of deionized water to form about a 10 percent solids bath.

Zinc phosphated steel panels were cathodically coated by this bath (bath temperature 27° C.) using 350 volts for 90 seconds to produce adherent coatings on the cathode which when baked at 177° C. for 20 minutes gave hard, acetone-resistant films of about 1 mil thickness.

EXAMPLE IV

A reaction vessel was charged with 3474 parts by weight of EPON 829 (3333.3 parts solids) and 1121.5 parts by weight of Bisphenol A. The reaction mixture was heated under a nitrogen blanket to exotherm and the reaction continued at a temperature of 150° C. for about 2 hours. To 515 parts by weight of the reaction product prepared as described above and at a temperature of 160–170° C. was added 22.8 parts by weight of uracil and 10.5 parts by weight of a 10 percent solids solution [in phenyl CELLOSOLVE (ethylene glycol monophenyl ether)] of ethyl triphenyl phosphonium iodide catalyst. The reaction mixture was heated to exotherm and the reaction mixture held at a temperature of 170° C. for about 20 minutes and then heated to 200° C. for about 30 minutes. The reaction mixture was then cooled to 180° C. and thinned with 48 parts by weight of TEXANOL (2,2,4-trimethyl pentanediol-1,3-monoisobutyrate), 75.4 parts by weight of phenyl CELLOSOLVE and 29.1 parts by weight of ethyl CELLOSOLVE (ethylene glycol monoethyl ether). The mixture was cooled to 100° C. and 38.8 parts by weight of a 75 percent solids solution in isopropanol of dimethyl ethanolamine-lactic acid salt and 29 parts by weight of deionized water were added to the reaction mixture to quaternize the resin. After addition was completed, the resultant reaction mixture was cloudy and the reaction mixture was digested at 95°–95° C. for an hour to clear the mixture, after which time 20.9 parts by weight of methyl isobutyl ketone was added to the mixture. The resultant quaternized resin was viscous and had a solids content of 69.9 percent.

An electrodeposition bath was prepared by mixing 227 parts by weight of the quaternized resin prepared as described above with 33.5 parts by weight of 2-ethylhexanol fully capped 2,4-toluene diisocyanate. The mixture was then further combined with 21.5 parts by weight of methyl ethyl ketone, 2.9 parts by weight of dibutyltin diacetate catalyst and 1651 parts by weight of deionized water to form about a 10 percent solids electrodeposition bath. A cold rolled steel panel was cathodically electrocoated in this bath (bath temperature 25° C.) using 200 volts for 2 minutes to produce an adherent coating on the cathode which when baked at 177° C. for 45 minutes gave a hard film of 1.0–1.5 mil thickness. The coating was rough and somewhat cratered. The film had excellent solvent resistance in that after 40 double rubs with an acetone-wetted cloth, the film did not even soften.

We claim:

1. A method of coating a conductive substrate serving as a cathode which comprises passing electric current between an anode and said cathode in electrical contact with a water-dispersed composition comprising an aqueous dispersion of:
   (A) a quaternary ammonium salt group solubilized organic resin containing active hydrogen atoms which is the reaction product of:
      (1) a tertiary amine-acid salt, and
      (2) a polyepoxide;
   (B) a capped organic polyisocyanate stable at room temperature in the presence of said resin (A) and reactive with the active hydrogens of said resin (A) at elevated temperatures, to form a cured product cured through urethane crosslinks.

2. A method according to claim 1 wherein (B) is the reaction product of an organic polyisocyanate and a compound selected from the group consisting of a phenol, an aliphatic alkyl monoalcohol, a cycloaliphatic alkyl monoalcohol, an aromatic alkyl monoalcohol, a ketoxime, a tertiary hydroxylamine, and caprolactam.

3. A method according to claim 1 wherein (B) is the reaction product of an organic polyisocyanate and an aliphatic alkyl monoalcohol.

4. A method according to claim 1 wherein (A) and (B) are present in a ratio of about 0.1 to about 1.0 blocked isocyanate groups per active hydrogen.

5. A method according to claim 1 wherein (A) is an adduct of a tertiary amine-acid salt and a polyglycidyl ether of a polyphenol.

6. A method according to claim 5 wherein (B) is the reaction product of an organic polyisocyanate and a compound selected from the group consisting of an aliphatic alkyl monoalcohol, a cycloaliphatic alkyl monoalcohol, an aromatic alkyl monoalcohol, a phenol, a ketoxime, a tertiary hydroxylamine, and caprolactam.

7. A method according to claim 5 wherein (A) and (B) are present in a ratio of about 0.1 to about 1.0 blocked isocyanate groups per active hydrogen.

8. A method according to claim 1 wherein (A) is an adduct of a tertiary amine-acid salt and a polyglycidyl ether of Bisphenol A.

9. A method according to claim 8 wherein (B) is the reaction product of an organic polyisocyanate and a compound selected from the group consisting of an aliphatic alkyl monoalcohol, a cycloaliphatic alkyl monoalcohol, an aromatic alkyl monoalcohol, a phenol, a ketoxime, a tertiary hydroxylamine, and caprolactam.

10. A method according to claim 1 wherein (A) is an epoxy group-containing adduct of a tertiary amine-acid salt and a polyglycidyl ether of a polyphenol.

11. The method of claim 1 wherein the resin (A) has a backbone derived from the interpolymerization of an olefinically unsaturated glycidyl compound and at least one other copolymerizable olefinically unsaturated monomer.

12. The method of claim 11 wherein the resin (A) has a backbone derived from the interpolymerization of an olefinically unsaturated glycidyl compound, a hydroxyalkyl ester of an acrylic or methacrylic acid, and at least one other copolymerizable olefinically unsaturated monomer.

* * * * *

UNITED STATES PATENT AND TRADEMARK OFFICE
CERTIFICATE OF CORRECTION

PATENT NO. : 4,134,816
DATED : January 16, 1979
INVENTOR(S) : Joseph F. Bosso and Lance C. Sturni It is certified that error appears in the above-identified patent and that said Letters Patent are hereby corrected as shown below:

Column 8, line 48, "sorbiton palmitale" should be --sorbitan palmitate--.

Column 10, line 10, "containing" should be --coating--.

Column 10, line 56, "95°-95°C." should be --90°-95°C.--

Signed and Sealed this

Third Day of April 1979

[SEAL]

Attest:

RUTH C. MASON
Attesting Officer

DONALD W. BANNER
Commissioner of Patents and Trademarks